(12) United States Patent
Lu

(10) Patent No.: US 8,899,531 B2
(45) Date of Patent: Dec. 2, 2014

(54) CLAMPING DEVICE FOR ELECTRICAL CABLES

(71) Applicant: Bo Lu, Temple City, CA (US)

(72) Inventor: Bo Lu, Temple City, CA (US)

( * ) Notice: Subject to any disclaimer, the term of this patent is extended or adjusted under 35 U.S.C. 154(b) by 0 days.

(21) Appl. No.: 13/968,203

(22) Filed: Aug. 15, 2013

(65) Prior Publication Data

US 2014/0158838 A1 Jun. 12, 2014

(30) Foreign Application Priority Data

Dec. 12, 2012 (CN) .......................... 2012 1 0539062

(51) Int. Cl.
*F16L 3/22* (2006.01)
*F16L 3/10* (2006.01)

(52) U.S. Cl.
CPC ...................................... *F16L 3/105* (2013.01)
USPC .................... 248/68.1; 248/74.2; 248/74.4

(58) Field of Classification Search
USPC ........... 248/62, 63, 68.1, 72, 74.1, 74.2, 74.4, 248/313
See application file for complete search history.

(56) References Cited

U.S. PATENT DOCUMENTS

| 2,622,123 | A | * | 12/1952 | Eakin | 174/149 R |
|---|---|---|---|---|---|
| 2,712,167 | A | * | 7/1955 | Blanchard | 24/569 |
| T100,605 | I4 | * | 5/1981 | Christian | 248/68.1 |
| 5,271,588 | A | * | 12/1993 | Doyle | 248/68.1 |
| 6,308,921 | B1 | * | 10/2001 | Borzucki | 248/68.1 |
| 6,523,790 | B2 | * | 2/2003 | Sentpali et al. | 248/68.1 |
| 8,226,058 | B2 | * | 7/2012 | Chen | 248/219.4 |

* cited by examiner

*Primary Examiner* — Gwendolyn W Baxter
(74) *Attorney, Agent, or Firm* — Novoclaims Patent Services LLC; Mei Lin Wong

(57) ABSTRACT

A clamping device includes a first clamping member, a second clamping member, and a connecting arrangement providing on the first clamping member and the second clamping member. The connecting arrangement is configured to exert a clamping force between the first clamping member and the second clamping member, in such a manner that when the electrical cable slightly deforms due to thermal expansion and contraction, the first clamping member and the second clamping member are arranged to move with respect to each other so as to allow a slight relative movement between the first clamping member and the second clamping member for preventing unwanted damage to the electrical cable.

11 Claims, 4 Drawing Sheets

CLAMPING DEVICE FOR ELECTRICAL CABLES

CROSS REFERENCE OF RELATED APPLICATION

This is a non-provisional application claiming the benefit of priority to a foreign application number 201210539062.0 with a filing date of Dec. 12, 2012 in China. The content of this specification is incorporated herein by reference.

BACKGROUND OF THE PRESENT INVENTION

1. Field of Invention

The present invention relates to a clamping device, and more particularly to a clamping device which is for use on outdoor overhead electrical cables and is configured to optimally compensate the adverse effect brought by thermal expansion of the cables.

2. Description of Related Arts

Referring to FIG. 1 of the drawings, a conventional clamping device, such as a clamping device for overhead high voltage electrical cables 3P, usually comprises a first clamping member 9P having a plurality of first clamping arms 91P, a second clamping member 10P having a plurality of second clamping arms 100P, and a connecting device 4P providing on the first clamping member 9P and the second clamping member 10P.

A free end surface of each of the first clamping arms 91P and the second clamping arms 100P is curved for accommodating the electrical cables 3P when the first clamping member 9P is positioned on top of the second clamping member 10P, while the connecting device 4P is arranged to exert pulling forces against the first clamping member 9P and the second clamping member 10P for clamping the electrical cables 3P therebetween.

There are several disadvantages in association with the above-mentioned clamping device. First, the connecting device 4P is usually arranged to exert very large clamping forces to the two clamping members 9P, 10P because the mounting of the electrical cables 3P must withstand adverse weather conditions. However, when weather condition changes, the electrical cables 3P are subject to thermal expansion. This slight increase in diameters on the part of the electrical cables 3P will cause great stress within each of the electrical cables 3P. When the stress is not properly released or compensated, it may damage the electrical cables 3P or the clamping device. Moreover, when contraction occurs, the diameters of the electrical cables 3P reduce and this may lower the clamping force exerting on the electrical cables 3P. When this happens, the general resistance of the electrical cables 3P may increase and this may increase the temperature of the clamping device. Since the electrical cables 3P are normally supported overhead, it is very arduous for technicians to replace the damaged cables or the damaged clamping devices.

Second, in order to clamp the electrical cables onto the first clamping member 9P and the second clamping member 10P, a technician has to manually operate the connecting device 4P until the first clamping member 9P and the second clamping member 10P securely bias against each other. In this situation, the technician has no way to know when the first clamping member 9P and the second clamping member 10P are secure enough. However, when the electrical cables 3P are tightened too strongly, the electrical cables 3P may be damaged, especially when they are subject to thermal expansion as mentioned above.

SUMMARY OF THE PRESENT INVENTION

An objective of the present invention is to provide a clamping device which is for use on outdoor overhead electrical cables and is configured to optimally compensate the adverse effect brought by thermal expansion of the electrical cables.

Another objective of the present invention is to provide a clamping device which is for use on outdoor overhead electrical cables, and is capable of apprising a relevant technician as to when the electrical cables are securely tightened so as to prevent damage on the electrical cables.

Another objective of the present invention is to provide a clamping device which is for use on outdoor overhead electrical cables, and is capable of reducing the manufacturing and maintenance cost of the overhead electrical cables. The clamping device of the present invention is simple in structure, but is capable of achieving unexpectedly good performance.

In one aspect of the present invention, it provides a clamping device for at least one electrical cable, comprising:

a first clamping member;

a second clamping member; and a connecting arrangement providing on the first clamping member and the second clamping member and being configured to exert a clamping force between the first clamping member and the second clamping member for securely clamping the electrical cable between the first clamping member and the second clamping member, in such a manner that when the electrical cable slightly deforms due to thermal expansion and contraction, the first clamping member and the second clamping member are arranged to move with respect to each other so as to allow a slight relative movement between the first clamping member and the second clamping member for preventing unwanted damage to the electrical cable.

DETAILED DESCRIPTION OF THE PREFERRED EMBODIMENT

Figure 1:
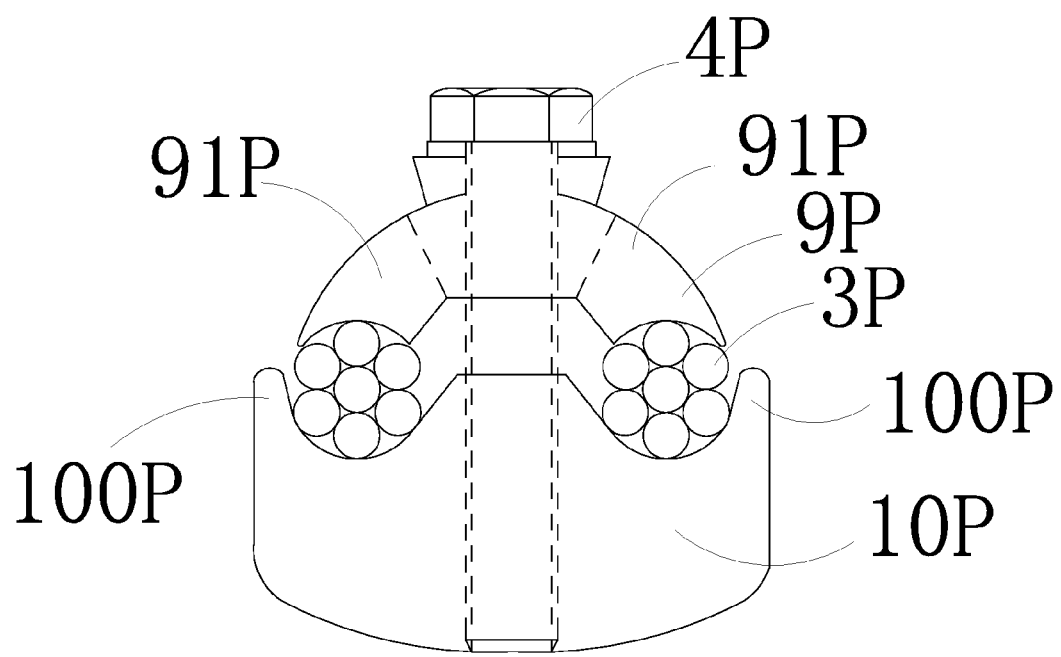
FIG. 1 is a conventional clamping device.

The following detailed description of the preferred embodiment is the preferred mode of carrying out the invention. The description is not to be taken in any limiting sense. It is presented for the purpose of illustrating the general principles of the present invention. Each of the inventive features described below can be used independently of one another or in combination with other features.

Referring to FIG. 2 to FIG. 5 of the drawings, a clamping device according to a preferred embodiment of the present invention is illustrated. The clamping device is for holding at least one electrical cable 3 which may comprise a plurality of electrical wires. Broadly, the clamping device comprises a first clamping member 1, a second clamping member 2 configured to have a predetermined elasticity or resilient ability, and a connecting arrangement 4.

The connecting arrangement 4 is provided on the first clamping member 1 and the second clamping member 2, and is configured to exert a clamping force between the first clamping member 1 and the second clamping member 2 for securely clamping the electrical cable 3 between the first clamping member 1 and the second clamping member 2, in such a manner that when the electrical cable 3 slightly deforms due to thermal expansion and contraction, the elasticity of the second clamping member 2 is arranged to allow a slight lateral or relative movement between the first clamping member 1 and the second clamping member 2 so as to prevent unwanted damage to the electrical cable 3.

According to the preferred embodiment of the present invention, the first clamping member 1 is normally positioned on a bottom of the second clamping member 2, and comprises a first main member 11, and a plurality of first supporting members 12 integrally, sidewardly and upwardly extending from two sides of the first main member 11. A height of each of the first supporting members 12 may be greater than that of the first main member 11 so as to constitute a substantially U-shaped cross section of the first clamping member 1.

Figure 2:
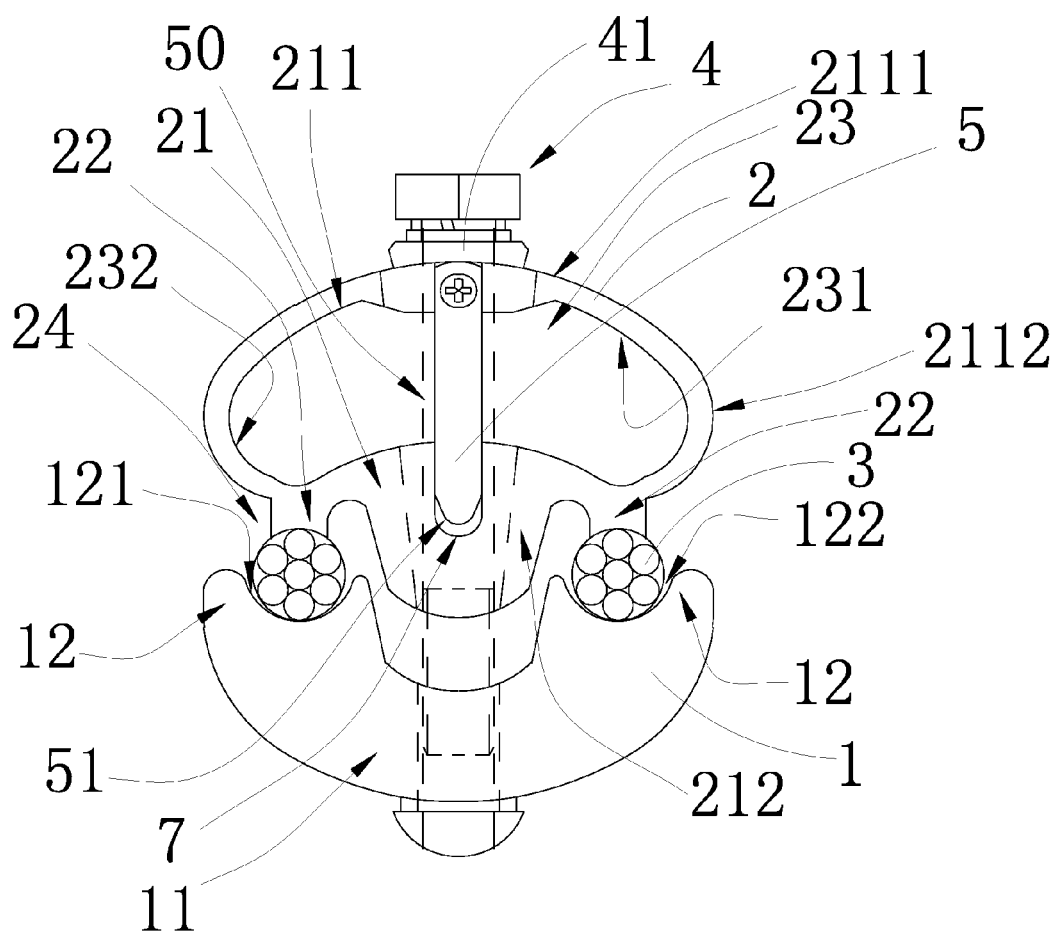
FIG. 2 is front view of a clamping device according to a preferred embodiment of the present invention.
Figure 3:
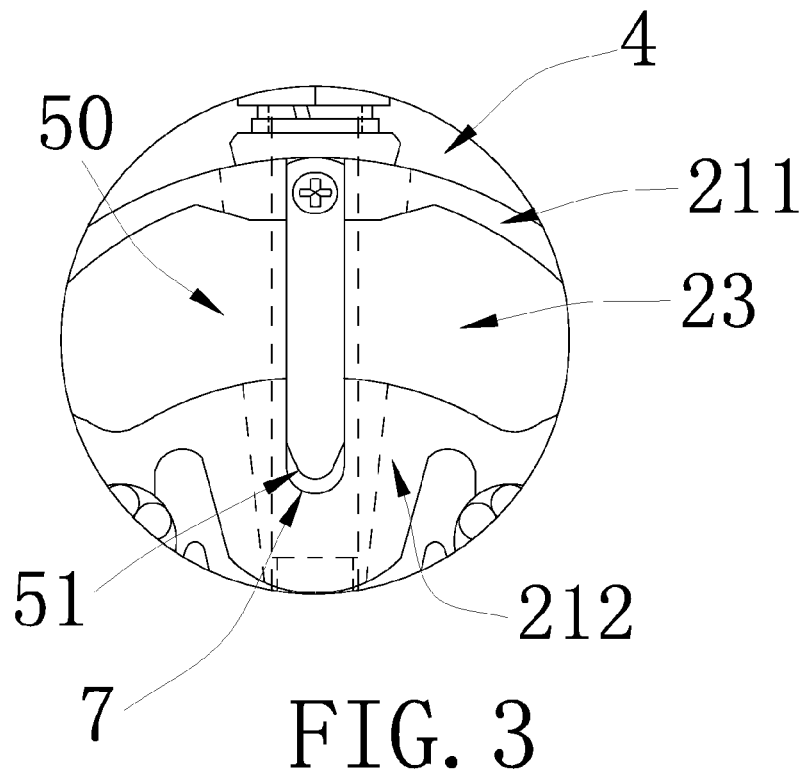
FIG. 3 is a partially enlarged view of the clamping device according to the preferred embodiment of the present invention.
Figure 5:
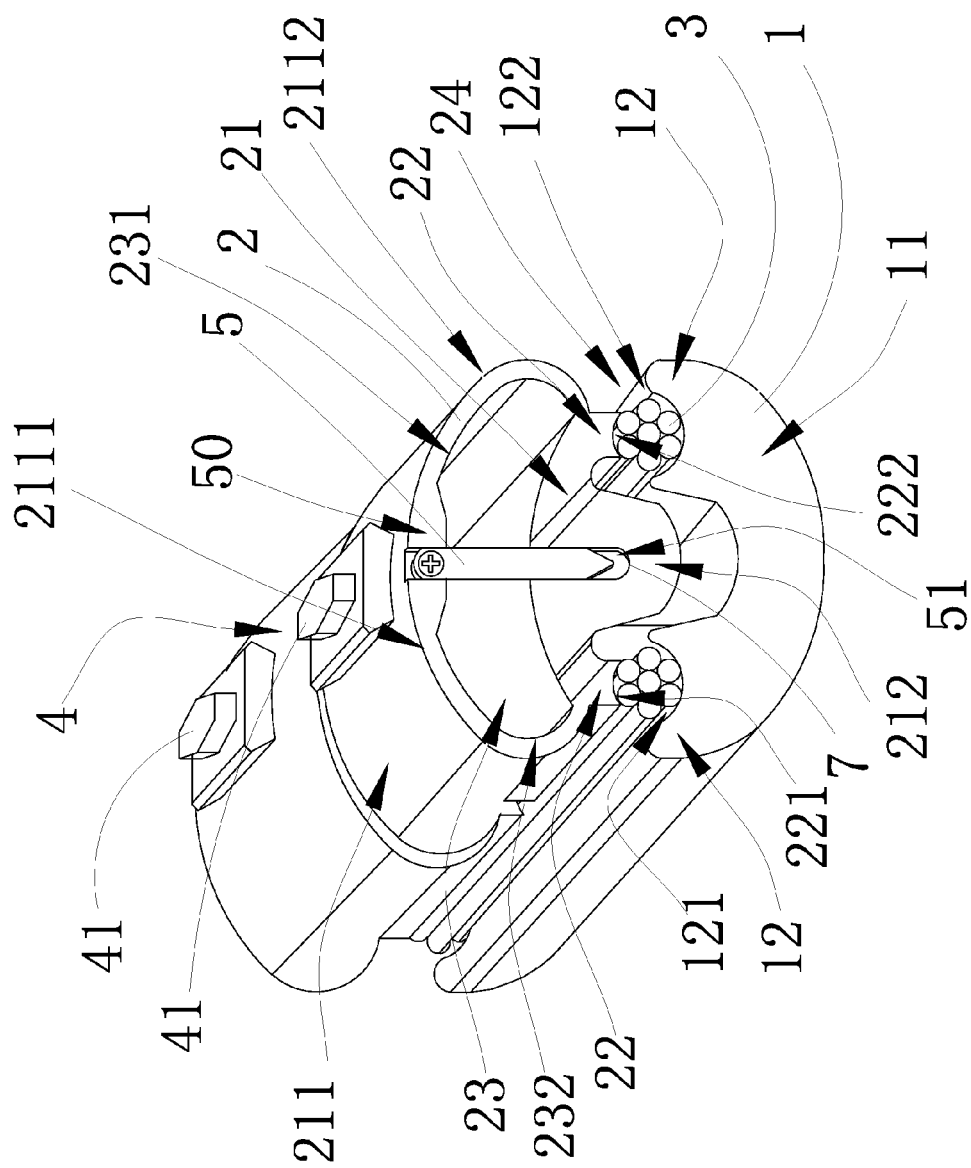
FIG. 5 is a perspective view of the clamping device according to the preferred embodiment of the present invention.

As shown in FIG. 2 and FIG. 5 of the drawings, each of the first supporting members 12 has a concavely curved end surface 121 for accommodating an electrical cable 3. In other words, each of the first supporting members 12 has a first supporting slot 122 defined by the first concavely curved end surface 121. The first supporting slot 122 is adapted to hold a relevant electrical cable 3 therein. Moreover, the first clamping member 1 is configured from a predetermined conductive material.

On the other hand, the second clamping member 2 comprises a second main member 21, and a plurality of second supporting members 22 integrally and downwardly extending from two sides of the second main member 21. Each of the second supporting members 22 has a second concavely curved end surface 221 for accommodating the two electrical cables 3. In other words, each of the second supporting members 22 has a second supporting slot 222 defined by the second concavely curved end surface 221. The second supporting slot 222 is adapted to hold a relevant electrical cable 3 therein. Moreover, the second clamping member 2 is also configured from a predetermined conductive material.

The second main member 21 of the second clamping member 2 has a through accommodating slot 23 extending along a longitudinal direction of the second main member 21. The accommodating slot 23 forms a substantially hollow structure on the second main member 21 so as to impart a predetermined amount of elasticity or resilient ability on the part of the second clamping member 2.

It is important to mention that the extent to which the second clamping member 2 may deform depends on the particular construction of the second clamping member 2. From simple physics, the elasticity of the second clamping member 2 depends on the shape of the accommodating slot 23 and a thickness of the sidewall surrounding the accommodating slot 23. The elasticity of the second clamping member 2 is caused by the inherent elasticity of the material configuring the second clamping member 2 with the specific elements thereof.

For example, as shown in FIG. 5 of the drawings, the second main member 21 has a top portion 211 and a lower portion 212 extending from the top portion 211 to normally position in a space formed between the first supporting members 12. The top portion 211 of the second main member 21 has a substantially kidney-shaped cross section having two curved longitudinal side edges 2111 and two curved transverse side edges 2112. A length of the two curved longitudinal side edges 2111 is substantially longer than that of the two curved transverse side edges 2112. Similarly, a cross sectional shape of the accommodating slot 23 also has a substantially kidney-shaped cross section having two curved longitudinal side edges 231 and two curved transverse side edges 232. A length of the two curved longitudinal side edges 231 is substantially longer than that of the two curved transverse side edges 232. In other words, the cross sectional shape of the accommodating slot 23 resembles that of the top portion 211 of the second main member 21.

As shown in FIG. 2 to FIG. 5 of the drawings, the second clamping member 2 is normally placed on top of the first clamping member 1 in such a manner that the first concavely curved surfaces 121 are aligned with the second concavely curved surfaces 221 respectively, wherein the first clamping member 1 and the second clamping member 2 are secured and tightened by the connecting arrangement 4. As one may appreciate, the four concavely curved surfaces 121, 221 form two accommodating spaces 24 wherein the two electrical cables 3 are securely accommodated within the two accommodating spaces 24 respectively when the connecting arrangement 4 has been tightened.

The connecting arrangement 4 comprises at least one connecting pin 41 penetrating the second clamping member 2 and the first clamping member 1 for selectively and adjustably tightening the first clamping member 2 against the second clamping member 1. The connecting pin 41 is preferably embodied as a connecting bolt and bolt nut assembly in which the bolt nut may rotatably engage with the connecting bolt and tighten the first clamping member 1 against the second clamping member 2.

In order to allow optimal connection between the first clamping member 1 and the second clamping member 2, the clamping device further comprises a securing arrangement 50 providing on the second clamping member 2 for indicating a connection status of the first clamping device 1 and the second clamping device 2. Specifically, the securing arrangement 50 comprises an indicating member 5 providing on the top portion 211 of the second main member 21, and contains a sliding slot 51 providing on the lower portion 212 of the second main member 21. A longitudinal axis of the sliding slot 51 is aligned with a longitudinal axis of the indicating member 5, which is elongated in structure. Moreover, the securing arrangement 50 further comprises a positioning mark 7 forming on a sidewall of the sliding slot 51 for indicating an optimal and desirable position of the indicating member 5.

Figure 4:
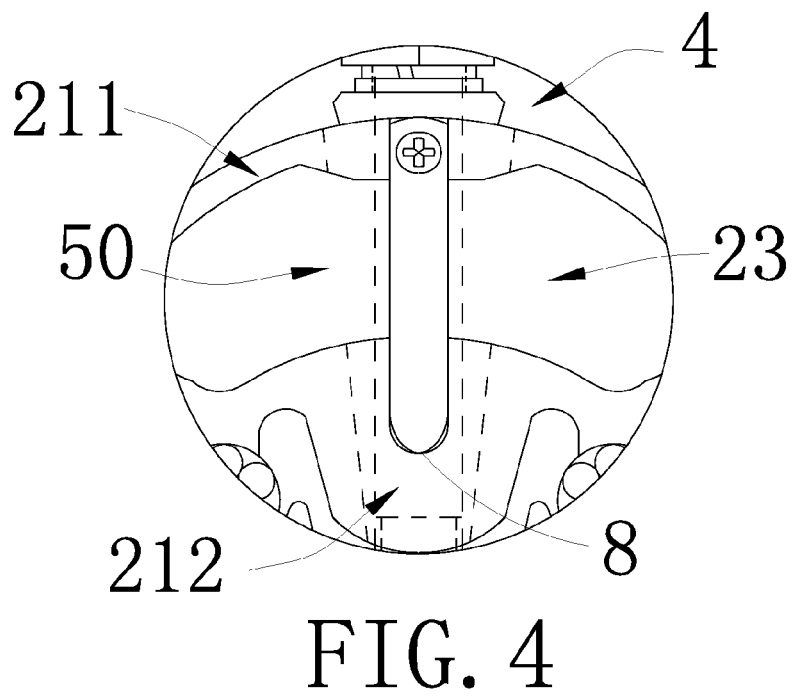
FIG. 4 is a schematic diagram of the clamping device according to the preferred embodiment of the present invention.

Thus, the indicating member 5 has one end attaching on a top edge of the top portion 212 of the second main member 21, and another end slidably engaging with the sliding slot 51. When the connecting pin is being tightened, a shape of the second clamping member 2 will slightly deform due to the elasticity or resilient ability imparted thereof (as mentioned above). And this makes the indicating member 5 slide in the sliding slot 51. In this preferred embodiment, the positioning mark 7 is formed such that when the a free end of the indicating member 5 slides to overlap with the positioning mark 7 (i.e. position 8 as shown in FIG. 4 of the drawings), the connection between the first clamping member 1 and the second clamping member 2 becomes optimal in terms of the tightening force exerted therebetween. In other words, when the indicating member 5 slides to overlap with the positioning mark 7, the technician tightening the connecting pin 41 will know that the connection between the first clamping member 1 and the second clamping member 2 is just about right, and he may then stop the tightening process. In this situation, the electrical cables 3 will not be clamped too strongly and this prevents the electrical cables 3 from being damaged. It is worth mentioning that the position of the positioning mark 7 depends on the particular shape and size of the first clamping member 1 and the second clamping member 2.

The operation of the present invention is as follows: the electrical cables 3 are initially placed on the first concavely curved surfaces 121 of the first clamping member 1. A technician may put the second clamping member 2 on top of the first clamping member 1, wherein the second concavely curved surfaces 221 are positioned right above the first concavely curved surfaces 121 for forming the two accommodating spaces 24. At the same time, the indicating member 5 is slid into the sliding slot 51 of the lower portion 212 of the second main member 21. The technician may then penetrate the connecting pin 41 through the first clamping member 1 and the second clamping member 2, and start tightening the connecting pin 41. During the tightening process, the second clamping member 2 may deform slightly. This makes the indicating member 5 slide along the sliding slot 51. When the indicating member 5 overlaps with the positioning mark 7 (position 8 as shown in FIG. 4), the technician may stop the tightening process and the electrical cables are now properly clamped.

When the electrical cables 3 are subject to thermal expansion, the second clamping member 2 may deform slightly to accommodate the increase in diameters of the electrical cables 3. This arrangement substantially relives stress concentration on the electrical cables 3 or the clamping device and prevent either of them from being damaged due to thermal expansion phenomenon. Conversely, when the electrical cables 3 are subject to thermal contraction, the second clamping member 2 will return to its original position and this prevent loosening of the connection between the first clamping member 1 and the second clamping member 2.

At this stage, it is important to mention that the lateral or relative movement between the first clamping member 1 and the second clamping member 2 may be accomplished by a wide variety of methods, and is not limiting to the preferred embodiment indicated above. For example, the relative movement between the first clamping member 1 and the second clamping member 2 may be accomplished by placing a spring or a resilient element on either the first clamping member 1 or the second clamping member 2. In this case, the first clamping member 1 and the second clamping member 2 may not deform (i.e. do not have resilient ability or elasticity).

As another example, the first clamping member 2 may form a hollow structure which possess a predetermined elasticity or resilient ability. In this situation, the second clamping member 2 may or may not need to form a hollow structure for achieving slight deformation. These examples are also included within the spirit of the present invention.

The present invention, while illustrated and described in terms of a preferred embodiment and several alternatives, is not limited to the particular description contained in this specification. Additional alternative or equivalent components could also be used to practice the present invention.

What is claimed is:

1. A clamping device for at least one electrical cable, comprising:
   a first clamping member;
   a second clamping member; and
   a connecting arrangement providing on said first clamping member and said second clamping member and being configured to exert a clamping force between said first clamping member and said second clamping member for securely clamping said electrical cable between said first clamping member and said second clamping member, in such a manner that when said electrical cable slightly deforms due to thermal expansion and contraction, said first clamping member and said second clamping member are arranged to move with respect to each other so as to allow a slight relative movement between said first clamping member and said second clamping member for preventing unwanted damage to said electrical cable,
   wherein said second clamping member is configured to have a predetermined elasticity for allowing said relative movement between said first clamping member and said second clamping member, and comprises a second main member, and a plurality of second supporting members integrally extending from two sides of said second main member, wherein each of said second supporting members has a second supporting slot defined by a second concavely curved end surface forming on said corresponding second supporting member,
   wherein said second main member of said second clamping member has a through accommodating slot extending along a longitudinal direction of said second main member, wherein said accommodating slot forms a substantially hollow structure on said second main member so as to impart said predetermined amount of elasticity thereon,
   wherein said second main member has a top portion and a lower portion extending from said top portion to normally position in a space formed between said first supporting members, wherein said top portion of said second main member has a substantially kidney-shaped cross section having two curved longitudinal side edges and two curved transverse side edges, wherein a length of said two curved longitudinal side edges of said top portion is substantially longer than that of said two curved transverse side edges of said top portion.

2. The clamping device, as recited in claim 1, wherein a cross sectional shape of said accommodating slot has a substantially kidney-shaped cross section having two curved longitudinal side edges and two curved transverse side edges, wherein a length of said two curved longitudinal side edges of said accommodating slot is substantially longer than that of said two curved transverse side edges of said accommodating slot.

3. A clamping device for at least one electrical cable, comprising:
   a first clamping member;
   a second clamping member; and
   a connecting arrangement providing on said first clamping member and said second clamping member and being configured to exert a clamping force between said first clamping member and said second clamping member for securely clamping said electrical cable between said first clamping member and said second clamping member, in such a manner that when said electrical cable slightly deforms due to thermal expansion and contraction, said first clamping member and said second clamping member are arranged to move with respect to each other so as to allow a slight relative movement between said first clamping member and said second clamping member for preventing unwanted damage to said electrical cable, wherein said first clamping member comprises a first main member, and a plurality of first supporting members integrally extending from two sides of said first main member to form a substantially U-shaped cross section of said first clamping member, wherein each of said first supporting members has a first supporting slot defined by a concavely curved end surface forming on the corresponding first supporting member for accommodating said one electrical cable, wherein said second clamping member is configured to have a predetermined elasticity for allowing said relative movement between said first clamping member and said second clamping member, comprises a second main member, and a plurality of second supporting members integrally extending from two sides of said second main member, wherein each of said second supporting members has a second supporting slot defined by a second concavely curved end surface forming on said corresponding second supporting member, wherein said second main member of said second clamping member has a through accommodating slot extending along a longitudinal direction of said second main member, wherein said accommodating slot forms a substantially hollow structure on said second main member so as to impart said predetermined amount of elasticity thereon, wherein said second main member has a top portion and a lower portion extending from said top portion to normally position in a space formed between said first supporting members, wherein said top portion of said second main member has a substantially kidney-shaped cross section having two curved longitudinal side edges and two curved transverse side edges, wherein a length of said two curved longitudinal side edges of said top portion is substantially longer than that of said two curved transverse side edges of said top portion.

4. The clamping device, as recited in claim 3, wherein a cross sectional shape of said accommodating slot has a substantially kidney-shaped cross section having two curved longitudinal side edges and two curved transverse side edges, wherein a length of said two curved longitudinal side edges of said accommodating slot is substantially longer than that of said two curved transverse side edges of said accommodating slot.

5. The clamping device, as recited in claim 4, wherein said connecting arrangement comprises at least one connecting pin penetrating said second clamping member and said first clamping member for selectively and adjustably tightening said first clamping member against said second clamping member.

6. The clamping device, as recited in claim 5, further comprising a securing arrangement providing on said second clamping member, wherein said securing arrangement comprises an indicating member providing on said top portion of said second main member, and contains a sliding slot providing on said lower portion of said second main member, wherein said securing arrangement further comprises a positioning mark forming on a sidewall of said sliding slot.

7. The clamping device, as recited in claim 6, wherein said indicating member has one end attaching on a top edge of said top portion of said second main member, and another end slidably engaging with said sliding slot.

8. The clamping device, as recited in claim 7, wherein said first clamping member and said second clamping member are configured from conductive material.

9. The clamping device, as recited in claim 4, wherein said first clamping member and said second clamping member are configured from conductive material.

10. A clamping device for at least one electrical cable, comprising:

a first clamping member;

a second clamping member;

a connecting arrangement providing on said first clamping member and said second clamping member and being configured to exert a clamping force between said first clamping member and said second clamping member for securely clamping said electrical cable between said first clamping member and said second clamping member, in such a manner that when said electrical cable slightly deforms due to thermal expansion and contraction, said first clamping member and said second clamping member are arranged to move with respect to each other so as to allow a slight relative movement between said first clamping member and said second clamping member for preventing unwanted damage to said electrical cable; and a securing arrangement providing on said second clamping member, wherein said securing arrangement comprises an indicating member providing on said second clamping member, and contains a sliding slot providing on said second main member, wherein said securing arrangement further comprises a positioning mark forming on a sidewall of said sliding slot.

11. A clamping device for at least one electrical cable, comprising:

a first clamping member;

a second clamping member; and a connecting arrangement providing on said first clamping member and said second clamping member and being configured to exert a clamping force between said first clamping member and said second clamping member for securely clamping said electrical cable between said first clamping member and said second clamping member, in such a manner that when said electrical cable slightly deforms due to thermal expansion and contraction, said first clamping member and said second clamping member are arranged to move with respect to each other so as to allow a slight relative movement between said first clamping member and said second clamping member for preventing unwanted damage to said electrical cable, wherein said second clamping member is configured to have a predetermined elasticity for allowing said relative movement between said first clamping member and said second clamping member, and comprises a second main member, and a plurality of second supporting members integrally extending from two sides of said second main member, wherein each of said second supporting members has a second supporting slot defined by a second concavely curved end surface forming on said corresponding second supporting member, wherein said first clamping member and said second clamping member are configured from conductive material.

* * * * *